United States Patent Office 3,207,771
Patented Sept. 21, 1965

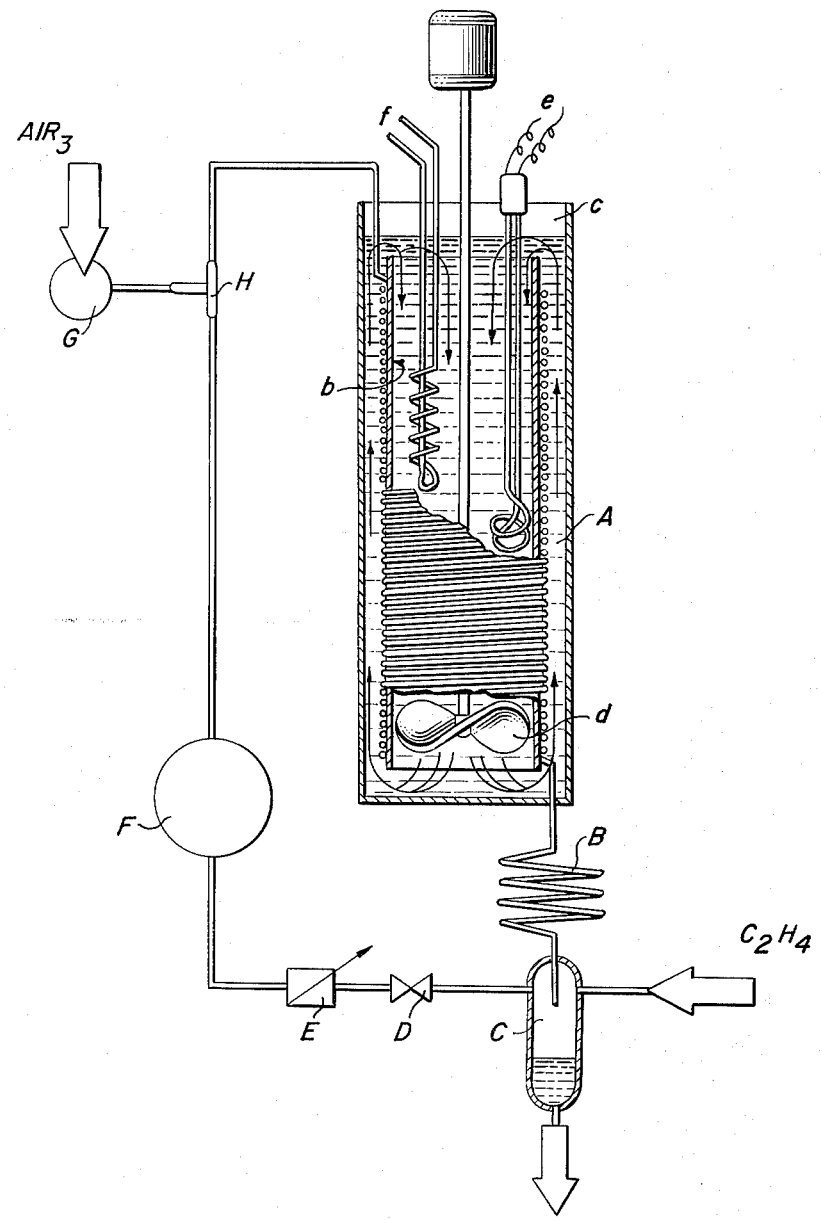

3,207,771
PRODUCTION OF ALUMINUM ALKYL COMPOUNDS
Kurt Zosel, Oberhausen, Germany, assignor to Karl Ziegler, Mulheim (Ruhr), Germany
Filed Nov. 28, 1960, Ser. No. 72,056
Claims priority, application Germany, Dec. 8, 1959, Z 7,707
13 Claims. (Cl. 260—448)

This invention is concerned with improvements in or relating to the production of aluminum alkyl compounds. More particularly it relates to the production of aluminum alkyl compounds with higher alkyl radicals from aluminum alkyl compounds with lower alkyl radicals.

It is known that ethylene can be added to aluminum alkyls, the reaction proceeding according to the following diagram:

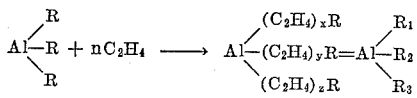

The addition of ethylene to aluminum alkyl compounds with lower alkyl radicals, for example ethyl, propyl or butyl radicals to form higher aluminum alkyl compounds is termed a synthesis reaction. Following the usual conditions of this synthesis reaction, aluminum triethyl or other aluminum trialkyls are treated with ethylene at pressures between approximately 50 and 200 atmospheres, preferably to about 100 atmospheres, and at temperatures up to at the most 100 to 120° C. An attempt has already been made to work at a lower ethylene pressure, but this was not possible, since on reducing the ethylene pressure, considerable quantities of free olefines are formed as well as the synthesised aluminum trialkyls, because the addition of further ethylene radicals proceeds too slowly and the spontaneous splitting off of free olefins with subsequent saturation of the Al-H bond by ethylene predominates.

The disadvantage of this known process for the production of higher aluminum alkyl compounds from starting compounds with lower alkyl radicals resides in the fact that the yield per unit of volume in unit time is not entirely satisfactory with the synthesis reaction. With the known processes, only about 1 mol of ethylene per mol aluminum trialkyl is added per hour, that is to say, the conversion of for example aluminum triethyl into a product having the average composition of aluminum tributyl lasts about three hours.

An attempt has also been made to accelerate the reaction by raising the temperature. However, if the temperature exceeded approximately 120° C., the quantity of the olefines split off increased progressively, even with a high ethylene pressure. At about 170–200° C. and higher, only the pure catalytic polymerisation of ethylene to higher olefines occurred, such as that described, in addition to the known synthesis reaction, in U.S. Patent specifications 2,695,327 and 2,699,457 in connection with the production of products of relatively high molecular weight. It is also stated in U.S. patent specification 2,826,598, in which the synthesis reaction to produce products of low molecular weight is described, that a very rapid absorption of ethylene occurs in the synthesis reaction at temperatures above 140° C., but simultaneously decomposition phenomena occur to an increasing extent and olefines are formed. Finally, considerable difficulties occur as regards the dissipation of the heat of reaction, especially when working on a larger scale, so that heat builds up and explosive decomposition of the ethylene can occur, with deposition of soot.

Quite different laws are applicable to the distribution of the different molecular sizes in the reaction products of the two limiting cases of the reaction of aluminum trialkyls with ethylene, namely, for the pure synthesis reaction and for the pure catalyst polymerisation. With the pure synthesis, the distribution is relatively narrow and a very large range of products of different C-numbers does not result. By suitable choice of the ratio between aluminum alkyl and ethylene, it is possible to influence the maximum of the bell-shaped distribution curve as required. An entirely different law applies, however, for the strictly catalytic conversion process, as a maximum at a predetermined molecular size does not occur in the molecular distribution in accordance with this law. It is true that a maximum occurs as regards the distribution by weight. However, it is extremely shallow, so that always a very large number of different homologous olefines is formed. It is of course desirable to obtain molecular size distribution which shows a maximum. The simultaneous formation of different olefines in relatively large proportions is therefore undesirable.

It has now been found surprisingly that contrary to all previous experiences the synthesis reaction can also be carried out at substantially higher temperatures.

According to the invention, there is provided a process for the production of an aluminum alkyl compound with higher alkyl radicals from an aluminum alkyl compound of the general formula $AlR_3$, in which R represents a lower alkyl radical, and ethylene, which comprises spraying the compound $AlR_3$ into a stream of ethylene, the stream being conveyed at a flow velocity of 1 to 50 m./minute and with a residence time of 1 to 20 minutes through a reaction chamber maintained at a temperature between 120 and 220° C., the reaction chamber having a diameter up to 3 cm. and a length which is very considerable in relation to this diameter.

Preferably, those aluminum alkyl compounds with higher alkyl radicals which are prepared will be those the alkyl radicals of which contain at least four carbon atoms. The compound $AlR_3$ used as starting material will preferably be one, the radicals R of which are lower alkyl radicals containing at least two carbon atoms.

The process according to the invention is preferably carried out with a flow velocity of 5 to 20 m./min.; residence times of from 2 to 10 minutes are preferred and preferred temperatures are from 140 to 170° C. It is preferred to operate at a working pressure in the reaction chamber of from 30 to 300 atmospheres, in particular of from 100 to 200 atmospheres. The process according to the invention is preferably so effected that the aluminum compound $AlR_3$ is sprayed into a circulating stream of ethylene.

Advantageously a helically coiled tube reactor, in which the reactants are conveyed downwardly in unidirectional flow is employed as reaction chamber for effecting the process according to the invention. When using the reaction conditions according to the invention, the yield per unit volume in unit time in the synthesis reaction is unexpectedly increased to approximately 10 times that previously possible, without the reaction product being contaminated by substantial quantities of olefines.

One particular advantage of the process according to the invention is that the average amount of synthesis of the final product can be accurately adjusted by regulating the flow velocity of the ethylene and the speed at which the aluminum alkyl compounds are pumped into the reaction chamber.

The difference between the process according to the invention and the known synthesis reaction for aluminum alkyl compounds is further explained by way of example only with reference to the following experiments taken in conjunction with the accompanying drawing showing an experimental apparatus suitable for carrying out the process according to the invention.

Experimental apparatus for carrying out the process of the invention comprises essentially a reactor A, a condenser B, a pressure separator C, a regulating valve D, a flow meter E, a circulation compressor F, a pump G for liquid under pressure and a mixing component H. The reactor A consists of a copper tube 40 metres long and with an internal diameter of 8 mm. (content 2 litres). This copper tube is wound with a 3% inclination on to an iron tube $b$ with a diameter of about 50 cm. and open top and bottom. The iron tube with the reactor coiled thereon is disposed in an oil bath $c$. A powerful stirrer device $d$ is fitted into the iron tube $b$. It forces the oil in the wide iron tube $b$ in a downward direction, from whence it flows upwardly at a considerably higher speed through the relatively narrow annular gap which is formed by the iron tube $b$ on the one hand and a wall of the oil bath $c$ on the other, and then it flows downwardly again through the iron tube $b$.

Located in the annular gap is the reactor wound in the form of a coil, which in this way is vigorously washed by the circulating oil. An immersion heater $e$ is also arranged in the iron tube $b$ for heating the system to reaction temperature and a condenser $f$ is also provided for dissipating the heat of reaction taken up by the relatively large quantity of oil.

The reactor is first of all brought to reaction temperature and the entire system is filled with ethylene at a desired pressure. The circulating compressor $f$, which constantly maintains a circulation of ethylene at the required pressure downwardly through the reactor is then switched on. The speed of circulation of the ethylene is regulated by operating the regulating valve D which is disposed in the intake pipe of the compressor F. The speed of circulation can be read off on the flow meter E. By means of the pressure liquid pump G, aluminum alkyl compound is sprayed into the mixing part H, which consists in principle merely of a construction of the ethylene pipe into which an injection nozzle also opens. In this way, the aluminum alkyl enters the ethylene stream at a point where the flow velocity is high and is entrained in atomised form by the stream of ethylene.

The method of operation is as follows: the mixing part H is connected by a short pipe with an internal diameter of 5 mm. to the upper end of the reactor A. The aluminum alkyl is in practice entrained in this pipe in atomised form in the stream of ethylene. If the stream of ethylene now enters the reactor, the flow velocity is naturally reduced. This means that the aluminum alkyl atomised in the stream of ethylene is deposited as a thin film on the wall of the reactor. The film formation results because of the larger diameter of the reaction tube as compared with the inlet pipe and because the overall velocity is carefully regulated so that the film formation will take place. The ethylene flowing through moves this film in the direction of the lower reactor outlet. After travelling through approximately 3 convolutions of the reactor, the stream of ethylene and the film of aluminum alkyl compound is at reaction temperature and from then on the reaction proceeds within the film. Due to the fact that the film is displaced relatively quickly along the reactor wall, the heat of reaction is satisfactorily transferred to the wall of the reactor. In addition, the ethylene flowing through at high speed carries with it heat of reaction from the inside of the reactor. The film thickness or the operational content of the reactor, that is the "hold-up," is dependent on various factors. A principal factor is the flow velocity of the ethylene, then the quantity of aluminum alkyl supplied per unit of time by the pressure liquid pump G and finally the operational pressure and the reaction temperature. Furthermore, the operational content of for example the first ten metres of the reactor is smaller than that of the following ten metres, and this again is smaller than the next following ten metres and so on, since the viscosity of the reaction product increases as the reaction progresses, the film becomes thicker and the ethylene stream accelerates the film to a lesser degree. This is of no significance as regards the reaction, but nevertheless it constitutes an advantage, because the concentration of All-C-bond per square centimeter of film surface thereby remains practically the same, so that the reaction proceeds throughout the entire length of the reactor at substantially the same speed. The operational content of the reactor can be altered between 5 and 40% of its volume by varying the conditions of the process.

Using the reactor described above as an example, it is possible in a simple manner to erect an installation with a reaction chamber of 20 or even as much as 200 litres, in which 10 or 100 reactor tubes of the same or similar dimensions are simply connected in parallel. In certain circumstances, all reactor tubes can be arranged in a single oil bath.

A series of experiments were carried out in the apparatus described above and aluminum triethyl was used as starting material in all these experiments. In the experiments, the reaction temperature (Experiments 7–10), the working pressure (Experiments 4–12), the gas circulation velocity (Experiments 7, 11 and 12) and the quantity of aluminum trialkyl supplied per unit of time (Experiments 16, 17 and 18) were varied. The average carbon number, the amount of free olefine and the yield per unit of volume in unit time were determined in respect of the synthesis products which were obtained and the results are set out in the following Table 1.

TABLE 1

| Experiment No. | Reaction temperature | Working pressure | Gas velocity, m./min. | Amount aluminum trialkyl | Average carbon number | Olefine content | Volume time yield g./hour and litre |
|---|---|---|---|---|---|---|---|
| 1 | 140 | 50 | 15 | 114 | $C_4$ | 5 | |
| 2 | 150 | 50 | 15 | 114 | $C_6$ | 8 | |
| 3 | 140 | 100 | 8.2 | 114 | $C_7$ | 2 | |
| 4 | 150 | 100 | 8.2 | 114 | $C_{12}$ | 5 | |
| 5 | 170 | 100 | 12 | 114 | $C_{12}$ | 4 | 267 |
| 6 | 170 | 100 | 12 | 342 | $C_9$ | 2.5 | 612 |
| 7 | 150 | 150 | 15 | 114 | $C_{3.5}$ | 1 | |
| 8 | 155 | 150 | 15 | 114 | $C_4$ | 1 | |
| 9 | 160 | 150 | 15 | 114 | $C_5$ | 1 | |
| 10 | 170 | 150 | 15 | 114 | $C_8$ | 2 | |
| 11 | 150 | 150 | 20 | 114 | $C_3$ | 1 | |
| 12 | 150 | 150 | 8.2 | 114 | $C_{10}$ | 1.2 | |
| 13 | 160 | 150 | 8.2 | 114 | $C_{16}$ | 1.7 | 350 |
| 14 | 160 | 150 | 8.2 | 228 | $C_{14}$ | 1.5 | 618 |
| 15 | 160 | 150 | 8.2 | 342 | $C_{11}$ | 1.2 | 738 |
| 16 | 150 | 200 | 7 | 114 | $C_{14}$ | 2 | 310 |
| 17 | 150 | 200 | 7 | 228 | $C_{12}$ | 1.5 | 530 |
| 18 | 150 | 200 | 7 | 342 | $C_{10}$ | 1 | 675 |
| 19 | 150 | 200 | 5 | 342 | $C_{15}$ | 1 | 992 |

The experiments established the following:

With a rise in temperature from 150 to 170° C., the average carbon number of the synthesis product is for example increased from 3.5 to 8, that is to say, by more than twice.

At the same reaction temperature and working pressure, a synthesis product with an average carbon number of 3.5 is obtained for example at a velocity of the ethylene stream of 15 m./min. With a gas velocity of 20 m./min., on the other hand, a synthesis product with a carbon number of 3 is obtained, whereas a synthesis product with a carbon number of 10 is obtained at a gas velocity of 8.2 m./min. This differential degree of synthesis undoubtedly depends on the very different residence time of the aluminum trialkyl in the reactor.

It was found in connection with Experiments 16, 17 and 18 that the average corbon number of the synthesis product can be reduced by increasing the quantity of the aluminum alkyl compounds which are supplied in relation to the quantity of ethylene. With an injection quantity of 114 g. of aluminum triethyl (1 mol per hour), a synthesis product with the average carbon number 14 was obtained, whereas 2 mols produced a carbon number of 12 and 3 mols a carbon number of 10.

The following Table 2 indicates the working data and the results of six additional experiments in which aluminum tripropyl was employed as starting material. It will be seen that the addition of ethylene to aluminum tripropyl proceeds in exactly the same way as the addition to aluminum triethyl.

Experiment 29

2000 g. per hour of the synthesis product obtained acording to Experiment 28 and having an average C-number of 6.5 were supplied to the reactor at a temperature of 152° C. and a pressure of 110 atm., and an hourly output of 3.2 kg. of a synthesis product with the average C-number of 11 was obtained.

Table 3 shows the exact distribution of the carbon number in the synthesis products which are obtained. The synthesis products were decomposed with very dilute sulphuric acid at low temperature; the hydrocarbons were separated out, washed and dried. The mixture was then split up on a Vigreux column each time into approximately 8 fractions, and the composition of these fractions was then investigated in each case by gas chromatography. The first column of Table 3 indicates the theoretical distribution of the carbon numbers of a synthesis product with the average C-number of 8, while the second column shows the distribution found with the synthesis product of Experiment 10. It can clearly be seen that the distribution actually found is very similar to the distribution to be expected theoretically. In the range of C-numbers from $C_6$ to $C_{18}$, there should theoretically be 79.8 mol percent, while actually 82.3 mol percent were found.

Column 3 reproduces the distribution found in respect of the synthesis product of Experiment 22, while column 4 shows the distribution found in respect of a synthesis product which had been prepared by the hitherto usual method for the production of such a product, i.e. at a

TABLE 2

| Experiment No. | Reaction temperature | Working pressure | Gas velocity, m./min. | Amount aluminum trialkyl | Average carbon number | Olefine content | Volume time yield g./hour and litre |
|---|---|---|---|---|---|---|---|
| 20 | 150 | 100 | 8.2 | 156 | $C_{11}$ | 4.5 | |
| 21 | 150 | 150 | 15 | 156 | $C_{3.5}$ | 1 | |
| 22 | 150 | 150 | 8.2 | 156 | $C_{9.5}$ | 2 | |
| 23 | 150 | 200 | 8.2 | 156 | $C_8$ | 1.5 | |
| 24 | 150 | 200 | 8.2 | 312 | $C_7$ | 1 | 324 |
| 25 | 150 | 250 | 5 | 468 | $C_{16}$ | 1 | 1,050 |

Details of other experiments effected with aluminum alkyls are set out below:

Experiment 26

600 g. of aluminum tri-n-butyl were supplied to the reactor per hour, with a reaction temperature of 160° C. and an ethylene pressure of 120 atm. 1350 g. of a synthesis product with an average C-number of 10 were obtained every hour.

Experiment 27

1000 g. per hour of aluminum tri-n-dodecyl were supplied to the reactor at 150° C. and 100 atm. and an hourly output of 1320 g. of a synthesis product with an average C-number of 16 was obtained.

Experiment 28

2000 g. per hour of aluminum triethyl were supplied to the reactor at a temperature of 170° and a pressure of 90 atm. and an hourly output of about 5.3 kg. of a synthesis product with an average C-number of 6.5 was obtained.

reaction temperature of about 100° C., a working pressure of about 100 atm., and a reaction time of about 8 hours.

With both synthesis products, about 79% thereof lies in the C-number range between $C_6$ and $C_{18}$. As regards the synthesis product of Experiment 22, this 79% is distributed practically completely among the odd-C-numbers, which means that practically no alkyl groups have been split off during synthesis.

On the other hand the 79% given in column 4 comprises a total of 14.9% of hydrocarbons which contain even numbers of carbon atoms.

These hydrocarbons can only have been formed by an alkyl group being split off during the synthesis reaction and by the ethylene being newly synthesized, which naturally leads to even-numbered hydrocarbons.

It is certain that the tendency to split off increases as the reaction temperature is higher. On the other hand, substantially higher temperatures have been used in Experiments 1 to 25 than in the experiment set out in column 4, and the olefine content of the synthesis product was nevertheless substantially smaller. This results from the fact that in the temperature range from 140 to 170° C., the residence time has a substantially stronger influence on the tendency to splitting off during the synthesis reaction than does the temperature.

TABLE 3

| C-number | 1<br>Theor.<br>distribution | 2<br>Experiment<br>10 | 3<br>Experiment<br>22 | 4<br>Distribution*<br>T=100° C.<br>P=100 atm.<br>Reaction<br>time=8 hrs. |
|---|---|---|---|---|
| $C_2$ | 5 | 2 | | |
| $C_3$ | | | 2 | 2 |
| $C_4$ | 15 | 7.7 | 1 | 4.6 |
| $C_5$ | | | 10.5 | 10.0 |
| $C_6$ | ↑ 22 | ↑ 21 | ↑ 0.5 | ↑ 7.0 |
| $C_7$ | | | 18.7 | 15.0 |
| $C_8$ | 22 | 20 | 0.5 | 3.2 |
| $C_9$ | | | 19.6 | 15.1 |
| $C_{10}$ | 18 | 16.7 | | 2.3 |
| | 78.8% | 82.3% | 78.7% | 78.6% |
| $C_{11}$ | | | 15.2 | 12.5 |
| $C_{12}$ | 10 | 10.7 | | 1.4 |
| $C_{13}$ | | | 13 | 12.9 |
| $C_{14}$ | 4.5 | 7.0 | | 0.5 |
| $C_{15}$ | | | 7 | 5.0 |
| $C_{16}$ | 2.5 | 3.9 | | 0.5 |
| $C_{17}$ | | | 4.2 | 3.2 |
| $C_{18}$ | ↓ 0.8 | ↓ 3.0 | ↓ | ↓ |
| $C_{19}$ | | | 3 | 1.8 |
| $C_{20}$ | 0.3 | 2.6 | | |
| $C_{21}$ | | | 2.5 | 1.5 |
| $C_{22}$ | 0.1 | 2.2 | | |
| $C_{23}$ | | | 1.3 | 1 |
| $C_{24}$ | | 1.8 | | |
| $C_{25}$ | | | 1 | 0.5 |
| $C_{26}$ | | 1.4 | | |

* Known method.

The aluminum alkyl used as starting material in all experiments was one which had been carefully purified by distillation and which no longer contained any catalyst fractions from the manufacturing process.

I claim:

1. Process for the production of aluminum trialkyls containing higher alkyl radicals which comprises passing a stream of ethylene gas downwardly through an elongated downwardly inclined reaction tube having a diameter of not in excess of 3 cm. and maintained at a temperature between about 120–200° C., spraying liquid aluminum tri (lower) alkyl into said stream prior to passage thereof through said reaction tube, depositing liquid aluminum trialkyl from said stream on the walls of said reaction tube to flow along the reaction tube with said stream of ethylene gas in contact therewith without filling the interior of the tube with liquid, maintaining the flow velocity of the stream between about 1–50 meters per minute and its residence time in the reaction tube between 1 and 20 minutes, and recovering the reaction product formed containing aluminum trialkyl with higher alkyl radicals.

2. Process according to claim 1 in which the aluminum trialkyl in the product formed contains alkyl radicals with at least 4 carbon atoms.

3. Process according to claim 1 in which the stream is passed through the reaction tube at a flow velocity of between 5–20 meters per minute.

4. Process according to claim 1 in which the stream is passed through the reaction tube with a residence time between about 2–10 minutes.

5. Process according to claim 1 in which the reaction tube is maintained at a temperature between about 140–170° C.

6. Process according to claim 1 in which the stream is passed through the reaction tube at a flow velocity between 5–20 meters per minute with a residence time between about 2–10 minutes, in which temperature of the reaction tube is maintained between about 140–170° C. and in which pressure in the tube is maintained between about 30–300 atmospheres.

7. Process according to claim 6 in which the pressure in the reaction tube is maintained between about 100–200 atmospheres.

8. Process according to claim 6 in which the reaction tube is maintained at a temperature between about 150–170° C.

9. Process according to claim 1 in which said reaction tube is a helically coiled tube.

10. Process according to claim 9 in which said reaction tube is a copper tube.

11. Process according to claim 1 in which said stream of ethylene gas is continuously circulated through said reaction tube.

12. Process according to claim 1 in which said liquid aluminum tri (lower) alkyl is a liquid aluminum tri (lower) alkyl which has been purified by distillation.

13. Process for the production of aluminum trialkyls containing higher alkyl radicals which comprises substantially continuously circulating a stream of ethylene gas at a pressure between about 100–200 atmospheres downwardly through an elongated, downwardly inclined helical copper reaction tube having a diameter not in excess of 3 cm. and maintained at a temperature between about 140–170° C., spraying liquid aluminum tri (lower alkyl) into said stream prior to passage thereof through said reaction tube, depositing liquid aluminum trialkyl from said stream on the walls of said reaction tube to flow along the reaction tube with said stream of ethylene gas in contact therewith without filling the interior of the tube with liquid, maintaining the flow velocity of the stream between about 5–20 meters per minute and its residence time in the reaction tube between about 5 to 20 minutes, and recovering the reaction product formed containing aluminum trialkyl with higher alkyl radicals.

References Cited by the Examiner

UNITED STATES PATENTS 2,971,969  2/61  Lobo _____ 260—448

TOBIAS E. LEVOW, *Primary Examiner.*

UNITED STATES PATENT OFFICE
CERTIFICATE OF CORRECTION

Patent No. 3,207,771            September 21, 1965

Kurt Zosel

It is hereby certified that error appears in the above numbered patent requiring correction and that the said Letters Patent should read as corrected below.

Column 3, line 30, for "f", in italics, read -- $F$ --; columns 3 and 4, TABLE 1, and columns 5 and 6, TABLE 2, headings to the fifth columns, for "Amount aluminum trialkyl" each occurrence, read -- Amount injected g/hour aluminum trialkyl --.

Signed and sealed this 12th day of April 1966.

(SEAL)
Attest:

ERNEST W. SWIDER
Attesting Officer

EDWARD J. BRENNER
Commissioner of Patents